J. W. PITTS.
MECHANICAL MOVEMENT.
APPLICATION FILED SEPT. 30, 1909.

969,561.

Patented Sept. 6, 1910.
2 SHEETS—SHEET 1.

WITNESSES

INVENTOR
John W. Pitts
BY
ATTORNEYS

J. W. PITTS.
MECHANICAL MOVEMENT.
APPLICATION FILED SEPT. 30, 1909.

969,561.

Patented Sept. 6, 1910.

2 SHEETS—SHEET 2.

WITNESSES
John A. Berghtons
Wm. P. Pattore

INVENTOR
John W. Pitts
BY
Munn & Co
ATTORNEYS

UNITED STATES PATENT OFFICE.

JOHN W. PITTS, OF BISBEE, ARIZONA TERRITORY.

MECHANICAL MOVEMENT.

969,561.  Specification of Letters Patent.  Patented Sept. 6, 1910.

Application filed September 30, 1909. Serial No. 520,282.

*To all whom it may concern:*

Be it known that I, JOHN W. PITTS, a citizen of the United States, and a resident of Bisbee, in the county of Cochise and Territory of Arizona, have invented a new and Improved Mechanical Movement, of which the following is a full, clear, and exact description.

This invention relates to means for the conversion of rotary into reciprocating motion and the reverse, between two mechanical elements, and its purpose is to provide novel details of construction for a mechanical movement of the character indicated, which are very simple, compactly arranged, strong and durable, operate with little friction and a minimum of applied power for useful effect.

The invention consists in the novel construction and combination of parts, as is hereinafter described, and defined in the appended claims.

Reference is to be had to the accompanying drawings forming a part of this specification, in which similar characters of reference indicate corresponding parts in all the views.

Figure 1:
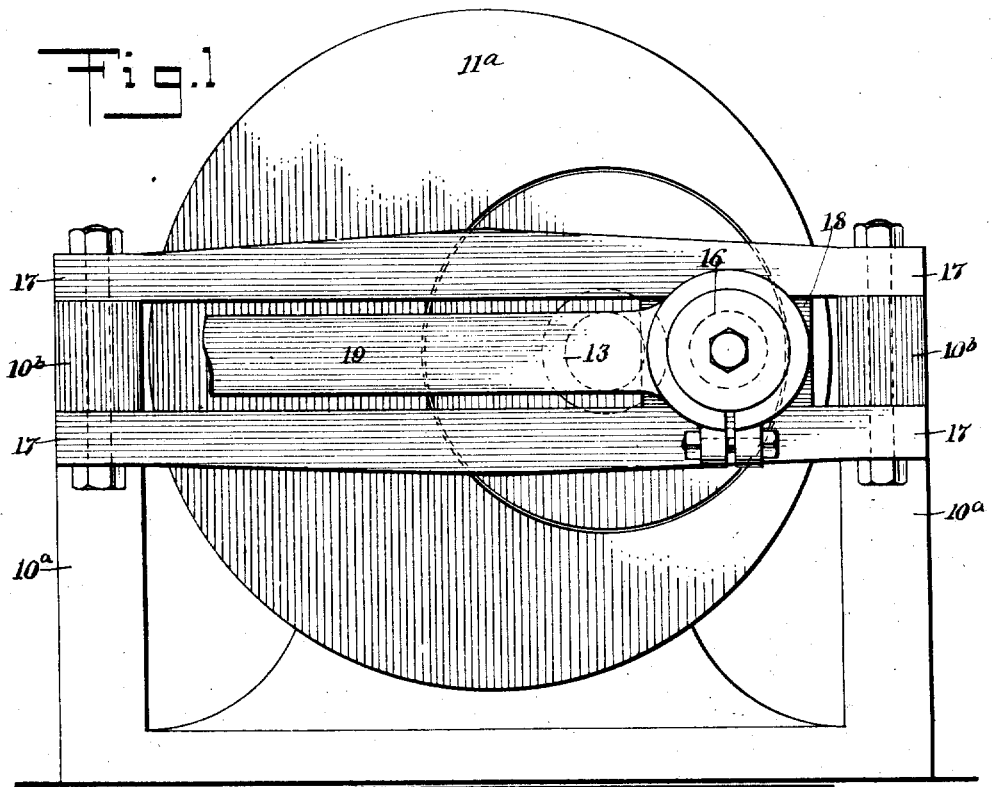
Figure 2:
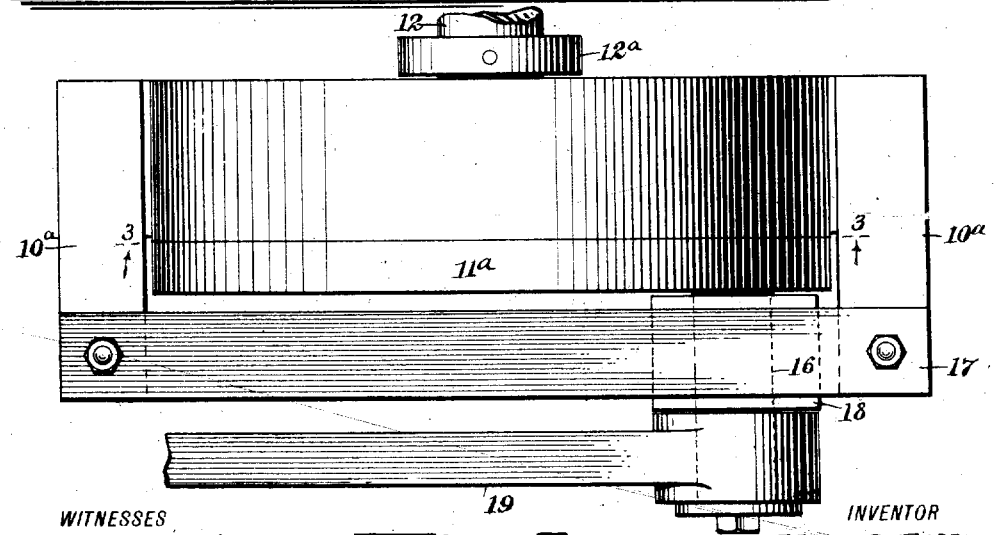
Figure 3:
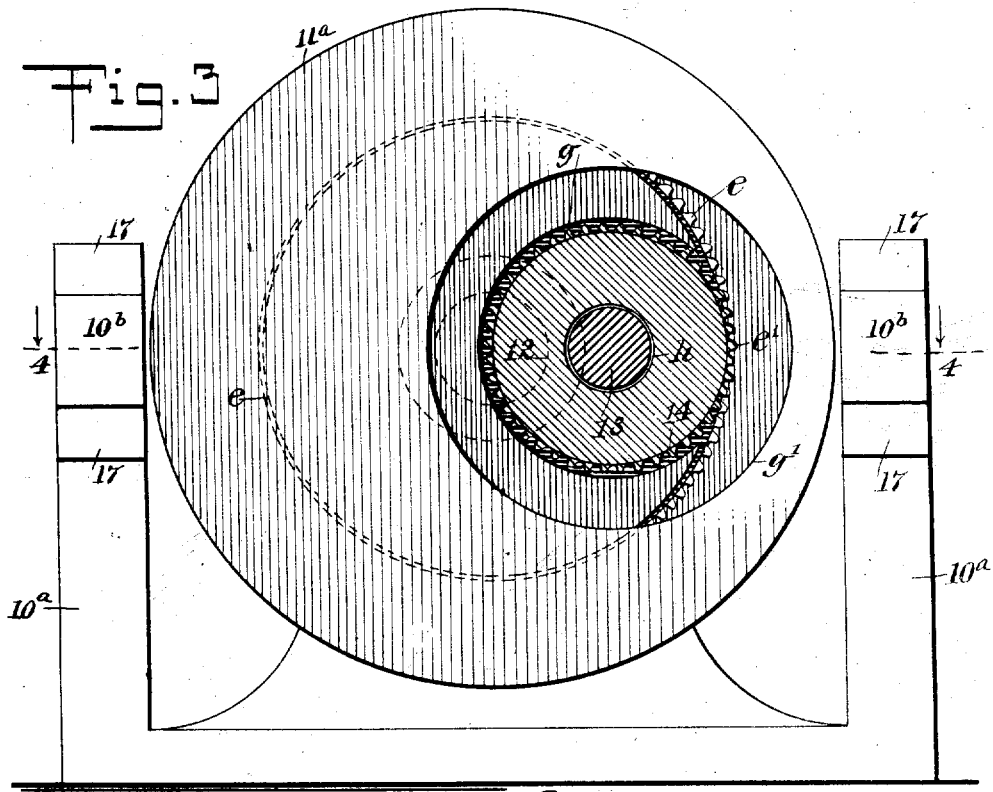
Figure 4:
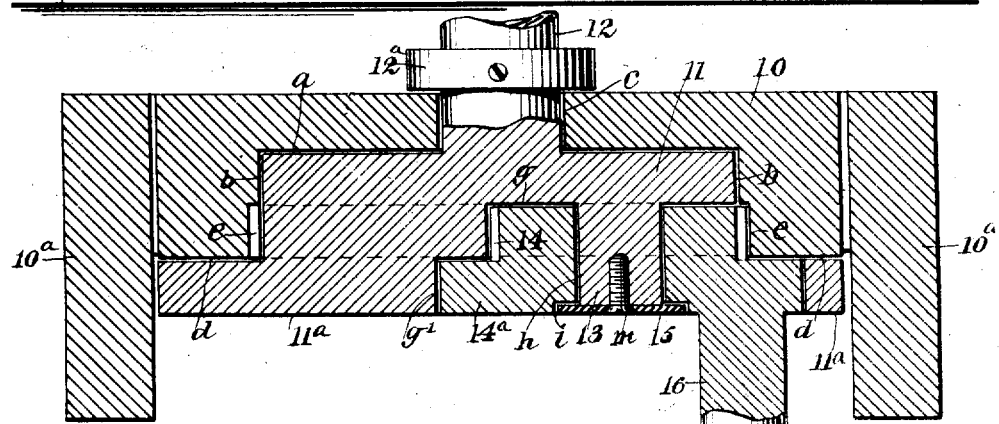

Figure 1 is a front elevation of the improved mechanical movement as applied for the conversion of rotary into reciprocating motion; Fig. 2 is a plan view of the same; Fig. 3 is a partly sectional side view of details exposed by the removal of a front wall of the device, on the line 3—3, in Fig. 2; and Fig. 4 is a sectional plan view, taken substantially on the line 4—4, in Fig. 3.

As hereinbefore indicated, the improvement may convert rotary motion had between two mechanical elements into reciprocating motion, or a slidable element that is connected by the improvement to a rotatable element, will when longitudinally reciprocated establish rotary movement in said rotatable element.

In the drawings that illustrate the details of the invention in one form of their construction, 10 indicates a supporting frame, that may be a portion of a moving structure such as a locomotive, or be stationary.

The portion 10, is in the form of an upright block having a circular periphery of proper diameter for its service, and centrally in said block a flat bottomed recess $a$, is formed, that is defined by a circular side wall $b$. Centrally in the recess $a$, a circular bore $c$, is formed in the upright circular block 10. In the recess $a$, is loosely fitted the rear portion of a disk 11, and at the center of said disk one end of a shaft 12, is attached, that is loosely fitted in the bore $c$, and projects therethrough, having a collar $12^a$, thereon, which contacts with the rear surface of the stationary block 10, said shaft, shown broken away, in complete form being extended to and connected with a source of power and rotary motion.

The front surface $d$ of the circular block 10, which defines the depth of the recess $a$, is true and parallel with the level bottom surface of said recess, and upon the disk 11, a circular peripheral flange $11^a$, is formed, that loosely contacts with the surface $d$, as shown in Fig. 4. In the circular side wall of the recess $a$, at or near the front face $d$ of the block 10, an internal gear $e$, is formed, said gear being concentric with the axis of the shaft 12. In the disk 11, a proper distance one side of its center, a circular recess $g$, is formed, which extends from the front surface thereof and cuts through the side wall of the same, thus forming an opening in said side wall opposite the internal gear $e$.

The recess $g$ is diametrically enlarged outside of the gear $e$, said enlarged recess $g'$ having a depth equal to the thickness of the flange $11^a$. Centrally in the recess $g$ a journal pin 13 is formed or secured, the true outer end surface of which is disposed nearly flush with the outer surface of the disk 11.

A spur gear 14, of proper diameter to engage its teeth $e'$ with those of the internal gear $e$, is centrally bored as at $h$, and through said bore is mounted upon the journal pin 13, thus causing the teeth $e'$ to mesh with the teeth $e$.

An annular recess $i$ is formed in the outer surface of the spur gear 14, around the bore $h$, said recess receiving a washer plate 15, that is secured in place on the pin 13 by a set screw $m$, as shown in Fig. 4. A peripheral flange $14^a$ is formed on the spur gear 14, outside of the teeth $e'$ on the latter, said flange occupying the counterbored enlargement $g'$ of the recess $g$, as shown in Fig. 4.

Upon the outer surface of the spur gear flange $14^a$, which is level with a like surface on the disk flange $11^a$, a journal pin 16 is formed or secured, and projects outward in a plane parallel with the axis of the pin 13. On spacing blocks $10^b$, that are portions of the frame $10^a$ which supports the circular stationary block 10, two guide bars 17 are mounted and secured at their ends, and thus disposed parallel with each other, said guide bars being positioned an equal distance from the center of the disk flange 11ª.

Upon the pin 16 a slide box 18 is mounted, the latter having a circular hole in it, which loosely receives the pin, and as indicated in Fig. 1, the slide-block is loosely fitted between the guides 17.

The operation is as follows: Upon rotation of the shaft 12 in either direction, the disk 11 will be correspondingly rotated, which will orbitally rotate the spur gear 14, and as said gear is meshed with the stationary internal gear e, it will be evident that the spur gear will be caused to rotate upon the journal pin 13. It will be seen that the combined rotary movements of the disk 11 and spur gear 14, that are in opposite directions, will cause the block 18 to reciprocate in the guides 17, thus converting the rotary movement of the shaft 12 into reciprocatory movement of the block 18. For useful effect, a pitman rod 19, shown broken, may be employed, that may be loosely mounted on a projected end of the pin 16, and said rod may obviously be connected to machinery for transmitting reciprocatory motion thereto.

While the present arrangement of parts shows the guides 17 disposed horizontally, it is apparent that they may be arranged vertically or at an incline, without preventing the proper reciprocation of the slide block.

It will be noted that the operation of the device may be reversed, that is, if the slide block is reciprocated by applied power, the gearing already described will convert the reciprocatory movement of said slide block into rotary motion in the shaft 12.

Having thus described my invention, I claim as new and desire to secure by Letters Patent:

1. The combination with a rotatably-supported shaft, and a stationary internal gear concentric with the shaft, of a disk rigid with the shaft and having a recess formed in its outer face at one side of its center, the said recess being enlarged at its outer portion, a journal pin projecting from the bottom of the recess in said disk, a spur gear in said recess and rotatable on the journal pin, the said spur gear meshing with the internal gear and having a flange fitting in the enlarged portion of the recess in the disk, a journal pin on the spur gear, and a slidably supported block on said journal pin.

2. The combination with a block supported on a frame, the said block being centrally bored and recessed in one side, of a flanged disk in said recess having a recess formed in its outer wall at one side of its center and enlarged at its outer portion, a shaft centrally extended from the disk and passing through the central bore in the block, an internal gear in the recessed block, a journal pin on the disk, a spur gear in said recess in the disk and mounted on said pin, the said spur gear meshing with the internal gear and having a peripheral flange fitting in the enlarged portion of the recess in the disk, and means for transmitting motion from the spur gear.

3. The combination with a stationary block having a central bore and circularly recessed in one side and an internal gear formed in said recess, of a disk seated in said recess, a shaft extending from the disk and passing through the bore in the block, the said disk having a recess formed in its outer face at one side of its center and enlarged at its outer portion, a spur gear in said recess in the disk and having a peripheral flange outside of the teeth fitting in the enlarged portion of the recess in the disk, a pin arranged eccentrically on the disk and on which the spur gear is mounted, means for holding the spur gear in position, said spur gear meshing with the internal gear, a pin on the spur gear, and a slidably supported block mounted on said pin.

4. The combination with a circular block supported by a frame, said block being centrally bored and circularly recessed in one side, and an internal gear formed in the circular side wall of the said recess, of a flanged disk seated in said recess, a shaft extending from the center of the disk through the bore in the block, the said disk having a circular recess formed in its outer face at one side of its center and enlarged at its outer portion, the said recess cutting through the side wall of the disk and forming an opening in said side wall opposite the internal gear teeth, a journal pin eccentrically projected from the disk, a spur gear rotatable on said pin and seated in said recess in the disk, the said spur gear meshing with the internal gear and having a peripheral flange outside of the teeth fitting in the enlarged portion of said recess in the disk, a pin on said spur gear at one side of the center, a slide block on said pin, and guides for supporting the slide block.

5. The combination with a stationary block centrally bored and circularly recessed in one side, an internal gear formed in the circular side wall of the recess, a flanged disk seated in said recess, a shaft extending from said disk through the bore in the block, the said disk having a circular recess formed in its outer face at one side of its center and enlarged at its outer portion, the said recess cutting through the side wall of the disk and forming an opening opposite the internal gear, of a spur gear seated in said recess in the disk and meshing with the internal gear, the said spur gear having a peripheral flange outside of the teeth and occupying the enlarged portion of said recess in the disk, the said spur gear being centrally bored, an eccentrically disposed pin projected from the disk and passing through the said bore in the spur gear, the said spur gear having an annular recess formed in its outer surface around the bore, a washer plate in said recess and secured to said pin, a journal pin eccentric on the spur gear and projecting from the outer surface, a slide block loosely mounted on said pin, and a pair of guide bars carried by the frame and between which the slide block reciprocates.

In testimony whereof I have signed my name to this specification in the presence of two subscribing witnesses.

JOHN W. PITTS.

Witnesses:
I. WHITMON WALLACE,
WILLIAM R. BANKS.